Nov. 8, 1932.    T. H. OPPENHEIM    1,886,722
FARM WAGON
Filed Jan. 30, 1931
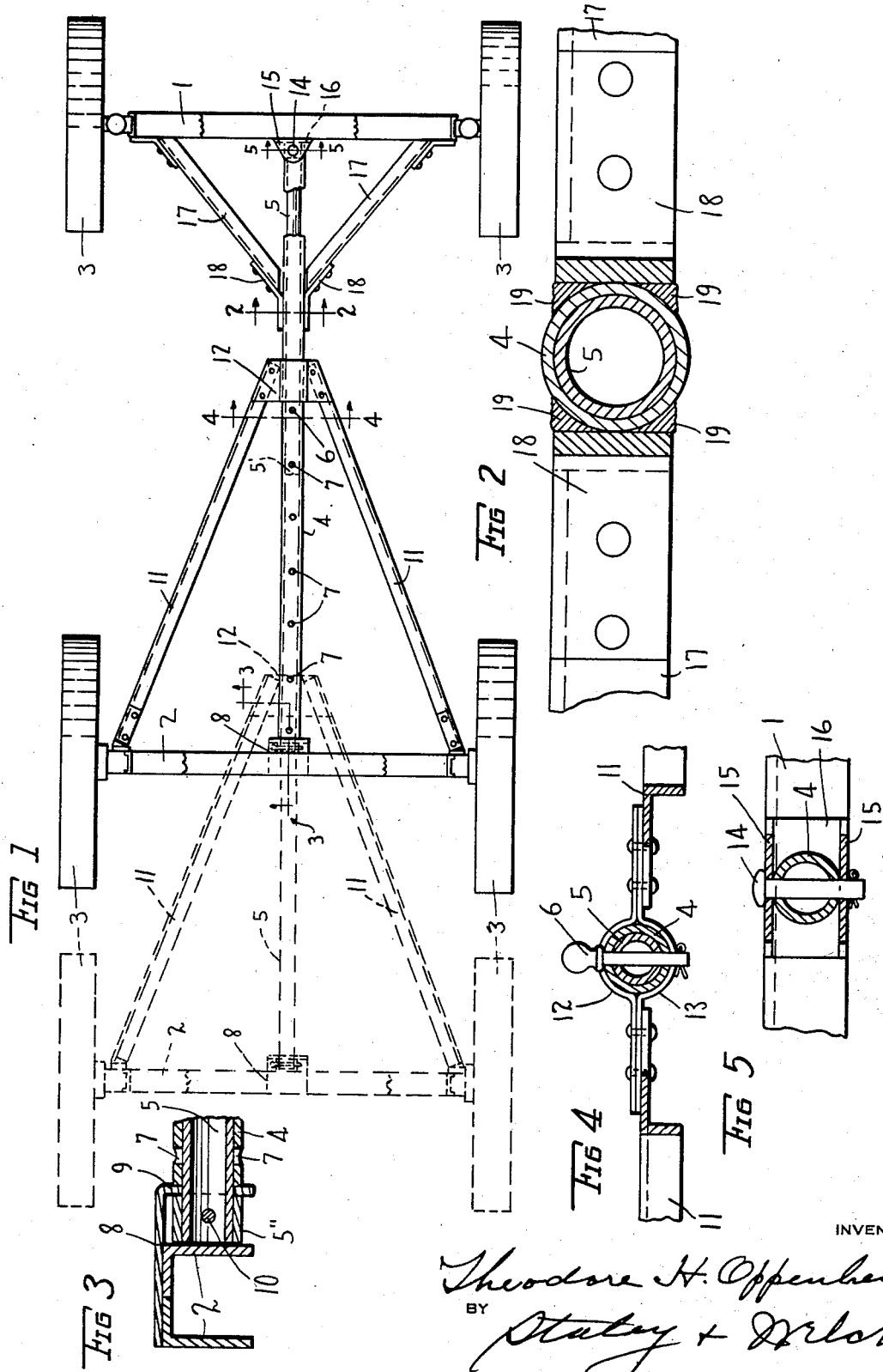

Patented Nov. 8, 1932

1,886,722

UNITED STATES PATENT OFFICE

THEODORE H. OPPENHEIM, OF COLDWATER, OHIO, ASSIGNOR TO THE NEW IDEA SPREADER COMPANY, OF COLDWATER, OHIO, A CORPORATION OF OHIO

FARM WAGON

Application filed January 30, 1931. Serial No. 512,314.

This invention relates to farm wagons of the type which has telescopic reach members to adjust the length of the wheel base.

An object of the invention is to provide a reach construction of maximum strength when the axles are adjusted to a longer wheel base.

Another and more specific object of the invention is the provision of an arrangement by which the front axle braces or hounds are attached to the outer telescopic reach members in such a manner that the complete telescoping of comparatively long inner and outer tubular reach members is freely permitted to allow said members to have a longer bearing when the wheel base is lengthened to substantially its maximum extent.

In the accompanying drawing:

Fig. 1 is a top plan view of a vehicle in the reach pole of which the principles of my invention are embodied.

Fig. 2 is an enlarged transverse section on the line 2—2 of Fig. 1.

Fig. 3 is a fragmentary enlarged longitudinal section on the line 3—3 of Fig. 1, the scale on which the view is drawn being somewhat less than that of Fig. 2.

Fig. 4 is a transverse section on the line 4—4 of Fig. 1, on the same scale as Fig. 3.

Fig. 5 is a transverse section on the line 5—5 of Fig. 1 on the same scale as Fig. 3.

Referring to the drawing, 1 represents the front axle, 2 the rear axle, and 3 the wheels of a vehicle, which in the present case, is an all metal farm wagon of otherwise well known construction, 4 and 5 are the outer and inner tubular members, respectively, of the reach, the member 4 being secured to the front axle, while the member 5 is attached to the rear axle, and when the axles are adjusted to the shortest possible distance therebetween, the inner member 5 is telescoped within the outer member 4 as is usual in such constructions. The coupling is effected by means of a pin 6 passing through both the inner and outer members, there being a series of openings 7 in the outer member 4, and a single opening in the inner member 5, by which various distances between the axles are obtained. In Fig. 1 the full lines indicate the wagon at its shortest wheel-base, while the broken outline shows the rear axle drawn rearwardly to the position occupied when the wheel base is at a maximum.

The inner member 5 is swivelly secured to the forward side of the rear axle, there being a plate 8 secured to the upper side of the axle 2 having a downturned flange 9 through which is an opening in which the rearward end portion of the inner member 5 is inserted; a loose collar 5″ being preferably provided between the axle and flange. After the rear end of the member 5 has been inserted through the flange and collar, a crosspin 10 is inserted through the said member and collar connecting said member with the rear axle 2; the member, however, being free to rotate in the opening in the flange 9.

The rear axle is braced to the reach by means of diagonally extending hounds 11 of angle section, one end of each of which is secured by any suitable means at a point near the outer ends of the axle adjacent the wheels. The forward ends of the hounds are secured to the opposite under sides of a pair of plates 12 and 13, each having a semicircular groove therein. The plates are assembled to present an approximately cylindrical opening formed by the mating grooves of the separate plates, and loosely enclose the outer member 4 which projects rearwardly through the plates so that the plates are slidable thereon.

The lengths of the outer and inner members 4 and 5 are substantially the same and are only slightly less than the distance represented by the short wheel base. This is for the reason that, in order to have a maximum bearing of the telescoped portions of the reach members 4 and 5 when in the position wherein the axles are adjusted to the greatest wheel base, the forward end of the inner reach member, indicated at 5′, should be well forward of the point where the reach construction is braced by the rear axle hounds, this point being in the vicinity of the plates 12 and 13 enclosing the outer member 4.

When the wagon is adjusted to the shorter wheel base, the long inner member telescopes within the outer member 5 and extends forwardly to the vicinity of the pin 14 by means of which the outer member is pivotally connected with the front axle, the pin passing through this member 4 and through the horizontal legs 15 of a U-shaped member 16 attached to the rearward side of the front axle. The front axle is braced to the reach by diagonal hounds 17 of angle section, one end of each of which is attached to the outer ends of the front axle, while the opposite end is secured to the outer telescopic member 4. In order to secure the advantage of the long bearing between the telescopic members before mentioned, when adjusted to give the longest distance between axles, it is essential that the members should telescope to substantially the fullest extent when the wheel base is at its shortest. It therefore becomes necessary that the inner member 5 should be able to pass the joint between the outer member 4 and the front hounds 17. To that end I provide a connection between the outer member and front hounds such that there will be no inner obstruction, such as bolts or other fastening devices, which would interfere with the free sliding movement of the inner member. The connection between each hound and the outer telescopic member is preferably made by a flat, bent bar 18 which in turn is preferably welded to the outer member 4 by electric welds 19, as shown in Fig. 2.

Although front axle bracing members comprise several parts as shown, it is apparent that the principles of the invention may be carried out by merely welding one end of each of the hounds directly to the tubular member, or by employing a bolting arrangement wherein the bolts or other securing means do not pass through the tubular members at the point of attachment of the front axle hounds with the reach construction. Further, instead of electric welds, other forms of welds may be employed such as acetylene welds or lap welds.

Having thus described my invention, I claim:

1. In a wagon of the character described, front and rear axles, an outer tubular telescopic member connected to said front axle, an inner telescopic member swivelly connected to said rear axle, diagonal braces between the front axle and the outer tubular member, means lying wholly in the outside of said outer tubular member for connecting the braces therewith at a point in the rear of the connection between said outer tubular member and said front axle, and a pair of braces extending from the rear axle and swivelly connected with said outer tubular member.

2. In a wagon of the character described, front and rear axles, an outer tubular telescopic member connected to one of said axles, an inner telescopic member rotatably connected to the other axle, braces between the outer tubular member and the axle to which it is connected, means lying wholly on the outside of said outer tubular member for connecting the braces therewith at a point in the rear of the connection between said outer tubular member and the axle with which it is connected, and a pair of braces extending from the other axle and rotatably connected with said outer tubular member.

3. In a wagon of the character described, front and rear axles, an outer tubular telescopic member and an inner telescopic member, one of said telescopic members being pivotally connected to one of said axles and the other rotatably connected to the other of said axles, a pair of brace members extending from the outer telescopic member to one of said axles, the connection between said braces and said outer tubular member being such as to leave the interior free and unencumbered, and a pair of braces connecting the other axle with said outer tubular member, the connection between said latter braces and said tubular member being a rotatable and slidable one.

4. In a wagon of the character described, front and rear axles, an outer tubular telescopic member and an inner tubular telescopic member, one of said telescopic members being connected to one of said axles and the other rotatably connected to the other of said axles to permit relative rotative movement, a pair of brace members extending from the outer telescopic member to one of said axles, the connection between said braces and said outer tubular member being such as to leave the interior free and unencumbered, and a pair of braces connecting the other axle with said outer tubular member, the connection between said latter braces and said tubular member being a rotatable and slidable one and also such as to permit relative rotative movement between the same.

5. In a wagon of the character described, front and rear axles, an outer tubular telescopic member and an inner tubular telescopic member, one of said telescopic members being connected to one of said axles, a connection between the other telescopic member and the other axle such as to permit the rise and fall of either end of said axle with relation to said telescopic member, a pair of brace members extending from the outer telescopic member to one of said axles, the connection between said braces and said outer tubular member being such as to leave the interior free and unencumbered, and a pair of braces connecting the other axle with said outer tubular member, the connection between said latter braces and said tubular member being a rotatable and slidable one.

6. In a wagon of the character described, front and rear axles, an outer tubular telescopic and an inner tubular telescopic member, one of said telescopic members being connected to one of said axles, a connection between the other telescopic member and the other axle such as to permit the axle to oscillate about the axis of the telescopic member, a pair of brace members extending from the outer telescopic member to one of said axles, the connection between said braces and said outer tubular member being such as to leave the interior of the telescopic member unencumbered to permit the other telescopic member to pass by the point of connection, and a pair of braces connecting the other axle with said outer tubular member, the connection between said latter braces and said tubular member being such as to permit relative oscillatory movement between the parts.

In testimony whereof, I have hereunto set my hand this 21st day of January, 1931.

THEODORE H. OPPENHEIM.